United States Patent
Enomoto

(10) Patent No.: US 12,101,709 B2
(45) Date of Patent: Sep. 24, 2024

(54) WIRELESS COMMUNICATION SYSTEM AND COMMUNICATION METHOD

(71) Applicant: JVCKENWOOD Corporation, Yokohama (JP)

(72) Inventor: Yoshimi Enomoto, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 289 days.

(21) Appl. No.: 17/695,884

(22) Filed: Mar. 16, 2022

(65) Prior Publication Data

US 2022/0210716 A1 Jun. 30, 2022

Related U.S. Application Data

(63) Continuation of application No. PCT/JP2020/034539, filed on Sep. 11, 2020.

(30) Foreign Application Priority Data

Oct. 2, 2019 (JP) .................. 2019-182146
Oct. 2, 2019 (JP) .................. 2019-182414

(51) Int. Cl.
*H04W 40/22* (2009.01)
*H04W 40/24* (2009.01)

(52) U.S. Cl.
CPC ......... *H04W 40/22* (2013.01); *H04W 40/248* (2013.01)

(58) Field of Classification Search
CPC .. H04L 27/2601; H04L 1/00; H04W 28/0268; H04W 28/10; H04W 76/10;
(Continued)

(56) References Cited

U.S. PATENT DOCUMENTS 9,877,237 B2 * 1/2018 Nuss ............... H04W 36/04
2010/0210289 A1 * 8/2010 Rooks ............. H04M 1/72502
455/11.1
(Continued)

FOREIGN PATENT DOCUMENTS

JP 2009-224907 10/2009
JP 2009-239585 10/2009
(Continued)

OTHER PUBLICATIONS

International Search Report and Written Opinion for International Application No. PCT/JP2020/034539 mailed on Nov. 24, 2020, 9 pages.

*Primary Examiner* — Nathan S Taylor

(74) *Attorney, Agent, or Firm* — Amin, Turocy & Watson, LLP

(57) ABSTRACT

A wireless communication system includes relay communication devices including a target device; and a communication device. Each relay communication device includes: a first control unit acquiring, based on a wireless signal including origination information received from each of the target device and another relay communication device, signal intensity information relating to a signal intensity of the wireless signal; and a data adding unit adding the signal intensity information, time information, and its own identification information to the origination information, to update the origination information; and a communication unit broadcasting the updated origination information. The communication device includes: a second control unit acquiring the updated origination information; and an identifying unit
(Continued)

identifying, based on the updated origination information received from each relay communication device, at least two routes having different oldest route information among routes from the target device to the communication device through at least one relay communication device.

9 Claims, 12 Drawing Sheets

(58) Field of Classification Search
CPC ..... H04W 80/02; H04W 76/12; H04W 28/02; H04W 80/10; H04W 76/20; H04W 4/40; H04W 4/46; H04W 4/44; H04W 40/22; H04W 40/248; H04W 40/24; B60W 60/001; B60W 60/00; G05D 1/02; G01S 5/14; G01S 5/06

See application file for complete search history.

(56) References Cited

U.S. PATENT DOCUMENTS

| | | | |
|---|---|---|---|
| 2011/0216695 A1* | 9/2011 | Orth | H04W 40/00 |
| | | | 370/328 |
| 2013/0286942 A1* | 10/2013 | Bonar | H04L 45/24 |
| | | | 370/328 |
| 2014/0169262 A1* | 6/2014 | Noh | H04L 5/0037 |
| | | | 370/315 |
| 2018/0263034 A1* | 9/2018 | Nagakubo | H04W 24/10 |
| 2019/0007997 A1* | 1/2019 | Shiotani | H04W 88/04 |
| 2019/0349426 A1* | 11/2019 | Smith | G06F 16/1824 |
| 2020/0068656 A1* | 2/2020 | Yang | H04W 40/24 |
| 2020/0294401 A1* | 9/2020 | Kerecsen | G07C 5/008 |
| 2021/0356279 A1* | 11/2021 | Szigeti | G01C 21/3407 |

FOREIGN PATENT DOCUMENTS

| | | |
|---|---|---|
| JP | 2013-90135 | 5/2013 |
| JP | 2015-167296 | 9/2015 |
| JP | 2018-125624 | 8/2018 |

* cited by examiner

FIG.4

| ROUTE NAME | ROUTE | FIRST SIGNAL INTENSITY | SECOND SIGNAL INTENSITY | THIRD SIGNAL INTENSITY | ... |
|---|---|---|---|---|---|
| FIRST ROUTE | SLAVE UNIT $30_4$ → SLAVE UNIT $30_5$ | 3/10 | 6/10 | | ... |
| SECOND ROUTE | SLAVE UNIT $30_3$ → SLAVE UNIT $30_4$ → SLAVE UNIT $30_5$ | 5/10 | 3/10 | 6/10 | ... |
| THIRD ROUTE | SLAVE UNIT $30_6$ → SLAVE UNIT $30_7$ | 1/10 | 7/10 | | ... |
| ... | | ... | ... | ... | ... |

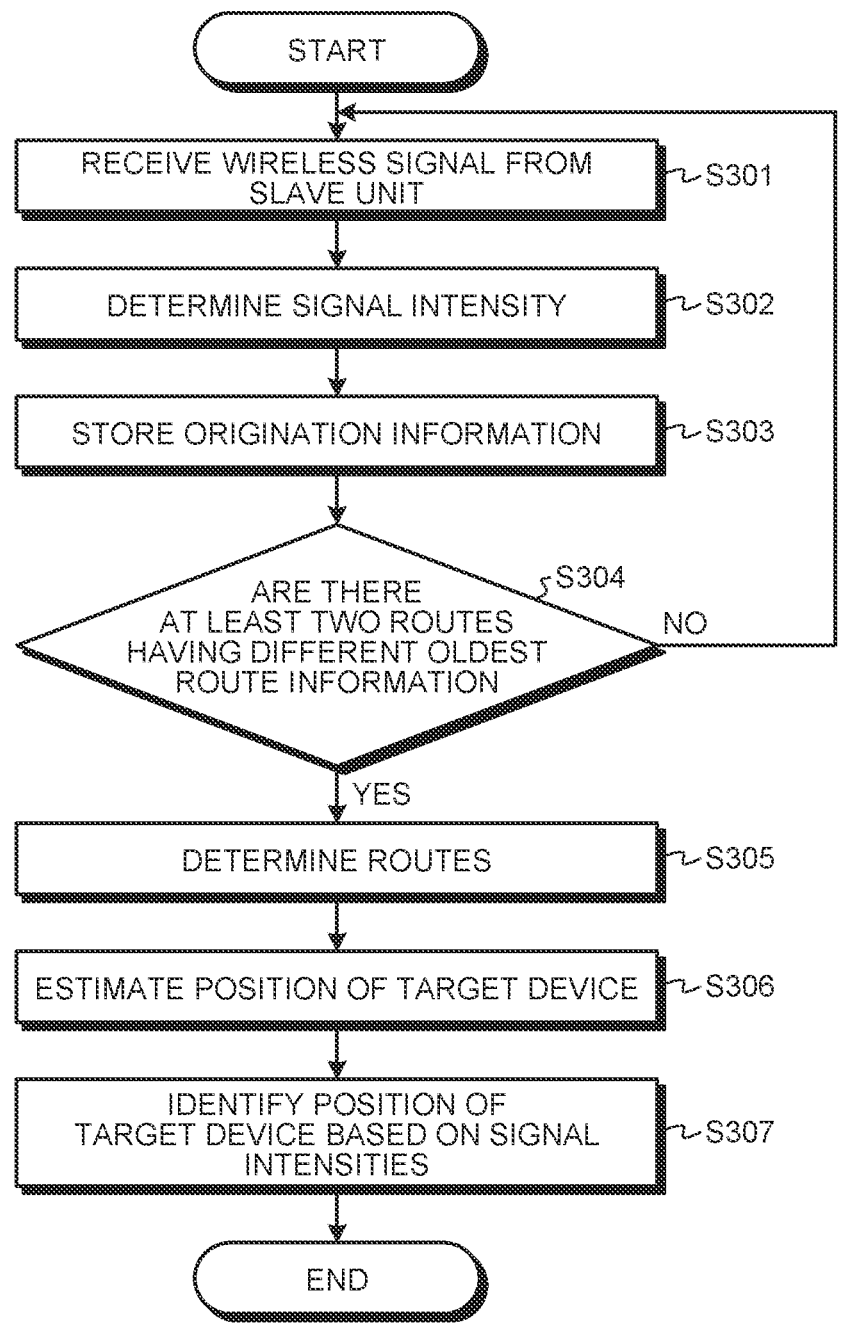

WIRELESS COMMUNICATION SYSTEM AND COMMUNICATION METHOD

CROSS-REFERENCE TO RELATED APPLICATION

This application is a Continuation of PCT International Application No. PCT/JP2020/034539 filed on Sep. 11, 2020 which claims the benefit of priority from Japanese Patent Application No. 2019-182146 filed on Oct. 2, 2019 and Japanese Patent Application No. 2019-182414 filed on Oct. 2, 2019, the entire contents of all of which are incorporated herein by reference.

BACKGROUND

The present disclosure relates to a wireless communication system and a communication method.

There is known a technique in which a transmitter having a function of performing communication using global positioning system (GPS) or Bluetooth (registered trademark) is arranged at a fixed position, and its own position is determined by receiving a signal from the transmitter.

For example, JP-A-2009-239585 describes a technique of detecting a position of an own vehicle based on a GPS signal.

However, although GPS enables to detect a position directly, it cannot be used indoor. Moreover, to identify a position of an own terminal, the terminal needs to be a master unit of Bluetooth. Specifically, when the master unit receives a signal, the master unit needs to identify its own position from position information of each transmitter held in advance, and to transmit identified information to a predetermined place by using a mobile phone line or a Wi-Fi (registered trademark) line. Accordingly, for example, there is a high possibility that it is not suitable to identify a position of a specific object from a predetermined remote site in a relatively large indoor area due to the restriction of communication cost and the restriction of communication equipment.

SUMMARY

A wireless communication system according to an aspect of the present disclosure includes a plurality of relay communication devices including a target device; and a communication device. Each of the relay communication devices includes a first control unit, a data adding unit, and a communication unit. The first control unit is configured to acquire, based on a wireless signal including origination information received from each of the target device and another relay communication device, signal intensity information relating to a signal intensity of the wireless signal. The data adding unit is configured to add the signal intensity information, time information, and identification information of its own to the origination information, to update the origination information. The communication unit is configured to broadcast the updated origination information. The communication device includes a second control unit, and an identifying unit. The second control unit is configured to acquire the updated origination information. The identifying unit is configured to identify, based on the updated origination information included in a wireless signal received from each of the relay communication devices, at least two routes having different oldest route information among routes from the target device to the communication device through at least one of the relay communication devices.

A communication method according to an aspect of the present disclosure is performed in a wireless communication system that includes a plurality of relay communication devices including a target device, and a communication device. The method includes: acquiring, by each of the relay communication devices, based on a wireless signal including origination information received from each of the target device and another relay communication device, signal intensity information relating to a signal intensity of the wireless signal; adding, by the each of the relay communication devices, the signal intensity information, time information, and identification information of its own to the origination information, to update the origination information; broadcasting, by each of the relay communication devices, the updated origination information; acquiring, by the communication device, the updated origination information; and identifying, by the communication device, a position of the target device based on at least two routes having different oldest route information, the at least two routes being identified based on the updated origination information included in a wireless signal received from each of the relay communication devices.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram for explaining origination information included in a signal received by the master unit;

FIG. 13 is a flowchart illustrating an example of a flow of processing of identifying a position of a target device by the master unit according to the embodiment of the present disclosure.

DETAILED DESCRIPTION

Hereinafter, an embodiment according to the present disclosure will be described in detail with reference to the accompanying drawings. This embodiment is not intended to limit the present disclosure, and when there are plural embodiments, combinations of the respective embodiments are also included. Moreover, in the following embodiments, the same reference signs are given to the same parts, so that duplicated explanation will be omitted.

Conventional Technique

Figure 1:
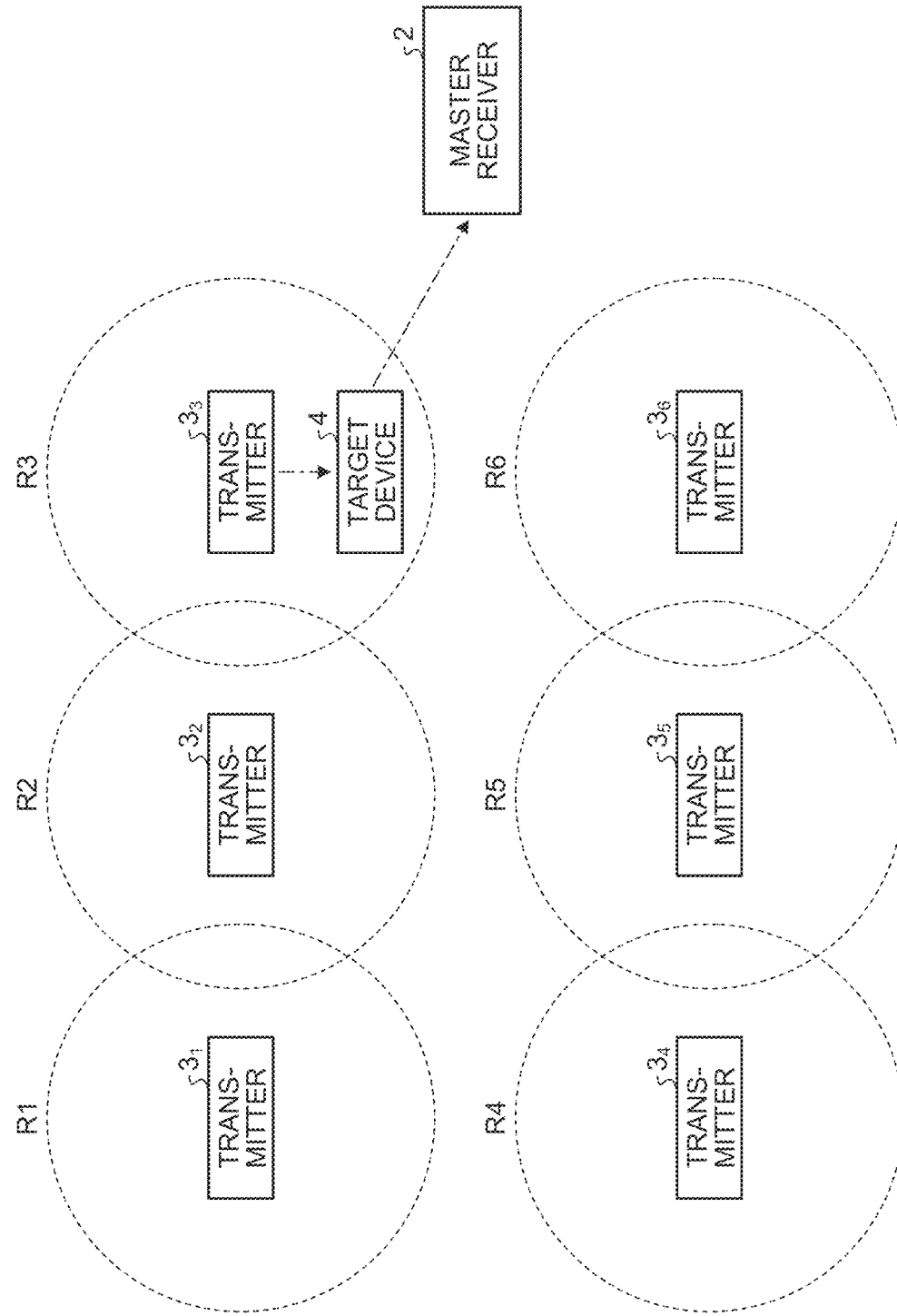
FIG. 1 is a diagram for explaining a conventional wireless communication system.

First, to facilitate understanding of the present disclosure, a conventional wireless communication system to detect a position of a target object will be described with reference to FIG. 1. FIG. 1 is a diagram for explaining the conventional wireless communication system.

A wireless communication system 1 includes, for example, a master receiver 2, a transmitter $3_1$, a transmitter $3_2$, a transmitter $3_3$, a transmitter $3_4$, a transmitter $3_5$, a transmitter $3_6$, a target device 4. The transmitters $3_1$ to the transmitter $3_6$ may be collectively referred to as transmitters 3.

The transmitters $3_1$ to the transmitter $3_6$ are transmitters each having a function of performing communication using Bluetooth. The communicable range of the transmitters $3_1$ is a range R1. The communicable range of the transmitters $3_2$ is a range R2. The communicable range of the transmitters $3_3$ is a range R3. The communicable range of the transmitters $3_4$ is a range R4. The communicable range of the transmitters $3_5$ is a range R5. The communicable range of the transmitters $3_6$ is a range R6. Specifically, in the wireless communication system 1, the respective transmitters are arranged to cover a predetermined range entirely.

The target device 4 is a communication device that performs near field communication. The target device 4 receives a signal by Bluetooth, for example, from a recognizable transmitter having a good communication quality among the transmitters $3_1$ to the transmitter $3_6$. In the example illustrated in FIG. 1, the target device 4 receives a signal by Bluetooth from, for example, the transmitters $3_3$, and transmits position information and the like to the master receiver 2 by near field communication.

As described above, the wireless communication system 1 is a system in which a Bluetooth transmitter and a near field communication system are combined. By combining the Bluetooth transmitter and the near field communication system, communication costs can be suppressed. However, because two kinds of wireless communication of Bluetooth and near field communication are used, the occupancy of a wireless band is high, and the cost of the equipment is relatively high. Moreover, when Bluetooth is used as information to identify a position, it is necessary to install many transmitters at places unobtrusive to users in order to improve the position accuracy and cover a wide range. Therefore, there have been problems such as an increase in cost and restrictions on installation places.

Accordingly, in the present embodiment, a wireless communication system capable of identifying a position of a specific target device is implemented while configuring all the wireless devices with near field communication devices.

Embodiment

Figure 2:
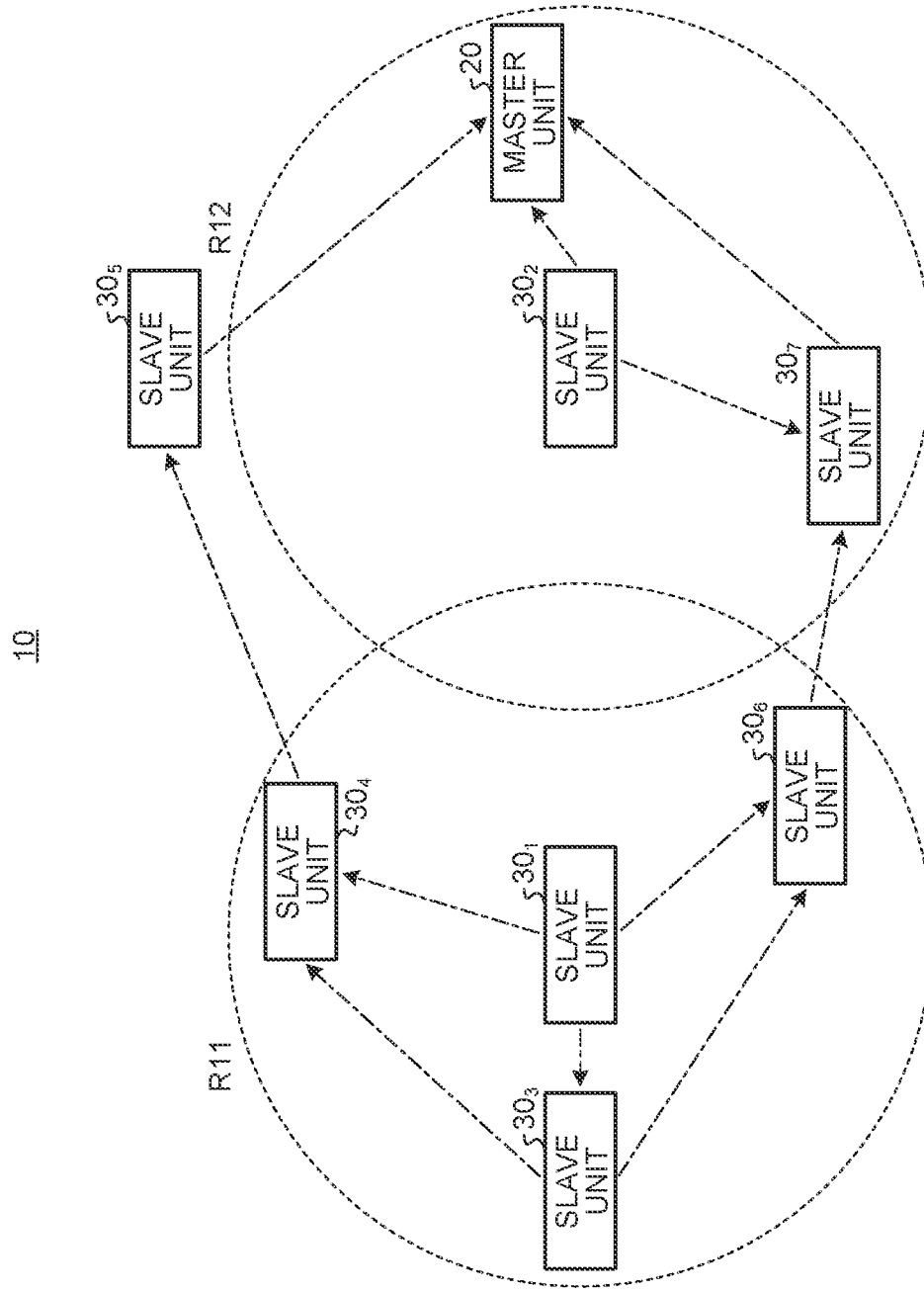
FIG. 2 is a diagram for explaining a configuration of a wireless communication system according to an embodiment of the present disclosure.

A configuration of a wireless communication system according to the embodiment of the present disclosure will be explained by using FIG. 2. FIG. 2 is a diagram for explaining a configuration of the wireless communication system according to the embodiment of the present disclosure.

As illustrated in FIG. 2, a wireless communication system 10 includes a master unit 20, a slave unit $30_1$, a slave unit $30_2$, a slave unit $30_3$, a slave unit $30_4$, a slave unit $30_5$, a slave unit $30_6$, and a slave unit $30_7$. The wireless communication system 10 is a system established in, for example, a large shopping mall including plural stores. The master unit 20, the slave unit $30_1$ to the slave unit $30_7$ are communication devices having a function of performing near field communication. The communication range of the master unit 20 and the slave unit $30_1$ to the slave unit $30_7$ by near field communication is, for example, about several tens to 200 m, but it is not limited thereto. The slave unit $30_1$ to the slave unit $30_7$ may be communication devices that are mounted and fixed at predetermined positions, or may be mobile communication devices. Moreover, the slave unit $30_1$ to the slave unit $30_7$ may be collectively referred to as slave unit 30.

The wireless communication system 10 is a wireless communication system that is capable of identifying, for example, when a specific slave unit (for example, the slave unit $30_1$ or the slave unit $30_2$) is lost, a position of the slave unit. In the following, a case in which the target devices whose positions are to be identified are the slave unit $30_1$ and the slave unit $30_2$ will be explained as an example.

The communicable range of the slave unit $30_1$ by near field communication is a range R11. The communicable range of the slave unit $30_2$ by near field communication is a range R12.

The slave unit $30_1$ and the slave unit $30_2$ broadcast a signal including at least their own identification information as origination information to the range R11 and the range R12, respectively, when a predetermined condition is satisfied. When the slave unit that transmits the origination information can acquire temporal information or time information such as time stamps collectively managed by the system, it is preferable to include the time information in the origination information. Hereinafter, it will be explained assuming that time information can be acquired. Moreover, information relating to a transmission frequency, an output power, a transmission antenna gain, and a reception antenna gain of the slave unit may be included in the origination information. When the slave unit that transmits the origination information cannot acquire the information described above, the master unit may be configured to perform a position detection using a predetermined one. Furthermore, when information relating to a space propagation loss or a loss caused by a building or the like can be acquired as environment information around the slave device, it may be included in the transmission information. Inclusion of the information described above in the transmission information enables the master unit to perform highly accurate position detection. The predetermined condition means a condition based on which lost of the slave unit $30_1$ and the slave unit $30_2$ is determined. The predetermined condition may be, for example, a case in which no operation is made for a predetermined period, or no change in ambient brightness is observed for a predetermined period. Moreover, the predetermined condition may be a case in which an environment, such as brightness or loudness of noise therearound, is different from a normal time when the slave unit $30_1$ and the slave unit $30_2$ are communication devices installed at predetermined places. Furthermore, the predetermined condition may be a case in which no positional change is observed for a predetermined period when the slave unit $30_1$ and the slave unit $30_2$ are mobile communication devices. The predetermined condition is not limited thereto, but may be other cases.

The slave unit $30_3$, the slave unit $30_4$, and the slave unit $30_6$ are positioned in the range R11. The slave unit $30_3$, the slave unit $30_4$, and the slave unit $30_6$ receive a wireless signal including the origination information transmitted by the slave unit $30_1$. Each of the slave unit $30_3$, the slave unit $30_4$, and the slave unit $30_6$ determines the intensity of the wireless signal received from the slave unit $30_1$. Each of the slave unit $30_3$, the slave unit $30_4$, and the slave unit $30_6$ adds the determined signal intensity, identification information of its own, and the time information to the wireless signal received from the slave unit $30_1$ to update the origination information. Each of the slave unit $30_3$, the slave unit $30_4$, and the slave unit $30_6$ broadcasts a wireless signal including the updated origination information. Thereafter, each slave unit that receives the wireless signal transmitted by any of the slave unit $30_3$, the slave unit $30_4$, and the slave unit $30_6$ updates the wireless signal by adding a signal intensity, identification information of its own, and time information to the origination information, and then broadcast a wireless signal including the updated origination information. In the wireless communication system 10, similar processing is repeated until the master unit 20 receives a wireless signal including the origination information. Thus, the origination information from the slave unit $30_1$ reaches the master unit 20 through multiple routes. That is, each of the respective slave units functions as a relay communication device. Because it becomes difficult to deliver the origination information to the master unit if a transmission route is looped, it is preferable to determine whether identification information of its own has been included in the origination information included in the received wireless signal, and to avoid broadcasting a signal including the updated origination information when the identification information of its own has been included.

In R12, which is the communication range of the slave unit $30_2$, the master unit 20 and the slave unit $30_7$ are arranged. In this case, a signal including the origination information transmitted by the slave unit $30_2$ is directly received by the master unit 20. The slave unit $30_7$ receives the signal from the slave unit $30_2$ and updates the origination information to transmit to the master unit 20.

Figure 3:
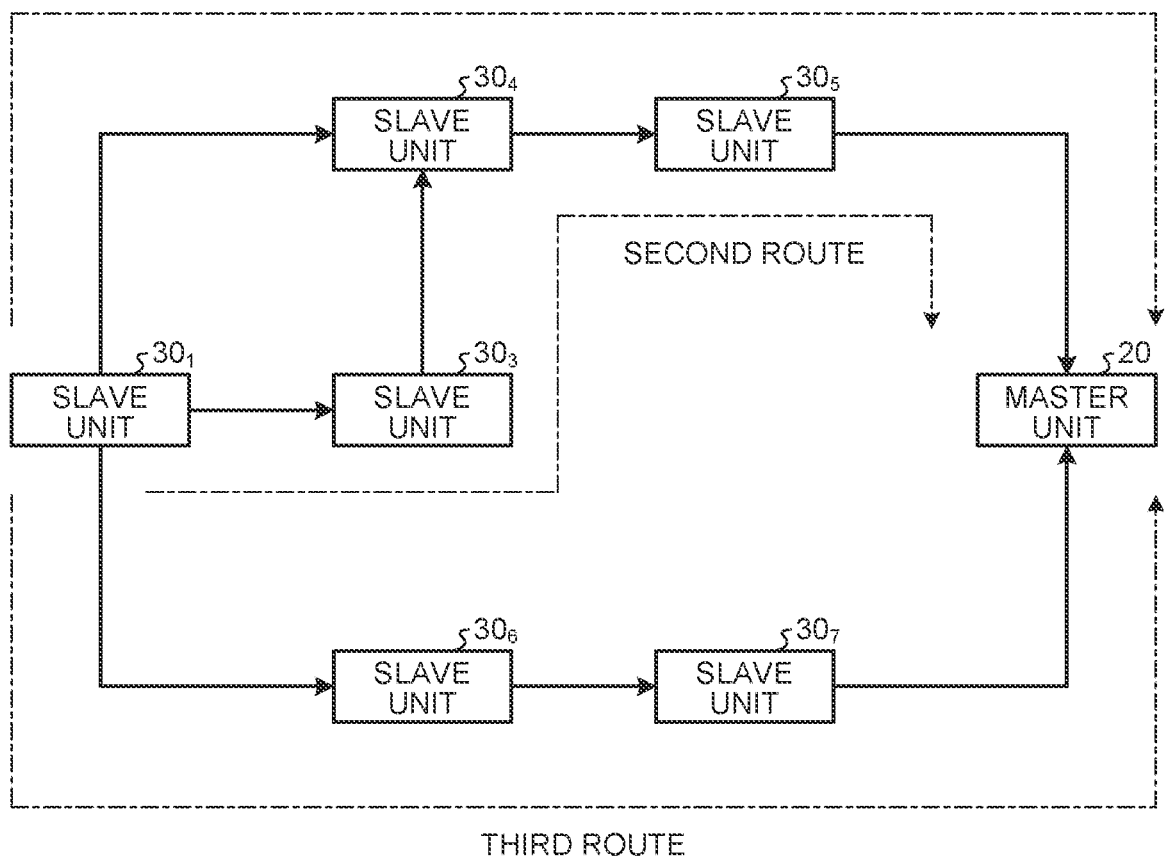
FIG. 3 is a diagram for explaining routes from a target device to a master unit.

A route from a target device to a master unit will be explained by using FIG. 3. FIG. 3 is a diagram for explaining a route from the target device to the master unit.

FIG. 3 illustrates routes from the slave unit $30_1$ to the master unit 20. As for the route from the slave unit $30_2$ to the master unit 20, because the same processing is performed therefor, explanation will be omitted.

As illustrated in FIG. 3, the origination information from the slave unit $30_1$ reaches the master unit 20 through the slave unit $30_4$ and the slave unit $30_5$ in order as a first route. The origination information from the slave unit $30_1$ reaches the master unit 20 through the slave unit $30_3$, the slave unit $30_4$, and the slave unit $30_5$ in order as a second route. The origination information from the slave unit $30_1$ reaches the master unit 20 through the slave unit $30_6$ and the slave unit $30_7$ in order as a third route.

The origination information through the first route includes the signal intensity at the time when the slave unit $30_4$ receives the wireless signal from the slave unit $30_1$, and the signal intensity at the time when the slave unit $30_5$ receives the wireless signal from the slave unit $30_4$. The origination information through the second route includes the signal intensity at the time when the slave unit $30_3$ receives the wireless signal from the slave unit $30_1$, and the signal intensity at the time when the slave unit $30_4$ receives the wireless signal from the slave unit $30_3$. The origination information through the third route includes the signal intensity at the time when the slave unit $30_6$ receives the wireless signal from the slave unit $30_1$, and the signal intensity at the time when the slave unit $30_7$ receives the wireless signal from the slave unit $30_6$. In other words, the master unit 20 acquires the signal intensity of each of the wireless signals received by the slave units present on the respective routes. Moreover, the master unit 20 may be configured to add, upon receiving a wireless signal from a slave unit, the determined signal intensity, the identification information of its own, and the time information to origination information included in the received wireless signal, so as to update the origination information. If the master unit 20 is configured to accumulate such origination information, a still a better configuration is obtained.

The origination information included in a signal received by the master unit will be explained by using FIG. 4. FIG. 4 is a diagram for explaining the origination information included in a signal received by the master unit.

As illustrated in FIG. 4, in the master unit, the origination information may be managed based on items, such as "ROUTE NAME", "ROUTE", "FIRST SIGNAL INTENSITY", "SECOND SIGNAL INTENSITY", and "THIRD SIGNAL INTENSITY".

The "ROUTE NAME" is information to identify a route. The "ROUTE NAME" may be, for example, information such as the first route, the second route, and the third route. Moreover, the route name may be managed by index number.

The "ROUTE" is information relating to a slave unit through which the origination information has been relayed from the slave unit $30_1$ to the master unit. The first route may indicate that the origination information has been relayed through the slave unit $30_1$ and the slave unit $30_5$. The second route may indicate that the origination information has been relayed through the slave unit $30_3$, the slave unit $30_4$, the slave unit $30_5$. The third route may indicate that the origination information has been relayed through the slave unit $30_6$ and the slave unit $30_7$. This information about a route may be indicated by identifying a slave unit name based on the identification information of the slave unit.

As for the first route, the "FIRST SIGNAL INTENSITY" indicates the signal intensity at the time when the slave unit $30_4$ receives a wireless signal from the slave unit $30_1$. As for the second route, the "FIRST SIGNAL INTENSITY" indicates the signal intensity at the time when the slave unit $30_3$ receives a wireless signal from the slave unit $30_1$. As for the third route, the "FIRST SIGNAL INTENSITY" indicates the signal intensity at the time when the slave unit $30_6$ receives a wireless signal from the slave unit $30_1$. Specifically, the "FIRST SIGNAL INTENSITY" is "3/10" as for the first route.

As for the first route, the "SECOND SIGNAL INTENSITY" indicates the signal intensity at the time when the slave unit $30_5$ receives a wireless signal from the slave unit $30_4$. As for the second route, the "SECOND SIGNAL INTENSITY" indicates the signal intensity at the time when the slave unit $30_4$ receives a wireless signal from the slave unit $30_3$. As for the third route, the "SECOND SIGNAL INTENSITY" indicates the signal intensity at the time when the slave unit $30_7$ receives a wireless signal from the slave unit $30_6$. Specifically, the "SECOND SIGNAL INTENSITY" is "6/10" as for the first route.

As for the first route, the "THIRD SIGNAL INTENSITY" indicates the signal intensity at the time when the slave unit $30_5$ receives a signal from the slave unit $30_6$. Specifically, the "SECOND SIGNAL INTENSITY" is "6/10" as for the first route. As for the first route and the second route, the signal intensity is not included in the origination information because the origination information reaches the master unit 20 through only two slave units.

In the example illustrated in FIG. 4, the "FIRST SIGNAL INTENSITY" to the "THIRD SIGNAL INTENSITY" are expressed in 10 scales of "1/10" to "10/10", but it is not limited thereto. In the present embodiment, for example, the signal intensity may be expressed by more scales, or may be expressed in decibels. Particularly, the signal intensity may be preferably expressed by a value using dBm which is a decibel unit with reference to 1 mW or using dBμ which is a decibel unit with reference to 1 μV.

The master unit 20 identifies a position of the slave unit $30_1$, which is the target device, based on the origination information received from each of the slave units. For example, to identify a position, a distance may be identified by using the Friis transmission formula. Moreover, if available, by identifying a distance using information relating to a transmission frequency, an output power, a transmission antenna gain, a reception antenna gain of a slave unit, and information relating to a space propagation loss or a loss caused by a surrounding building or the like, further accurate identification of a position is possible. For example, when the decibel unit is used, the distance may be calculated by using a relation in which a reception input power is equal to a result obtained by adding up an output power, a transmission antenna gain, and a reception antenna gain, and then subtracting a free space propagation loss and a loss caused by a surrounding building and the like. The master unit 20 identifies a position of the slave unit $30_1$ based on pieces of origination information that are received through at least two routes having different oldest route information. Having different oldest route information means that slave units that have received the origination information from the slave unit $30_1$ are different.

Figure 5:
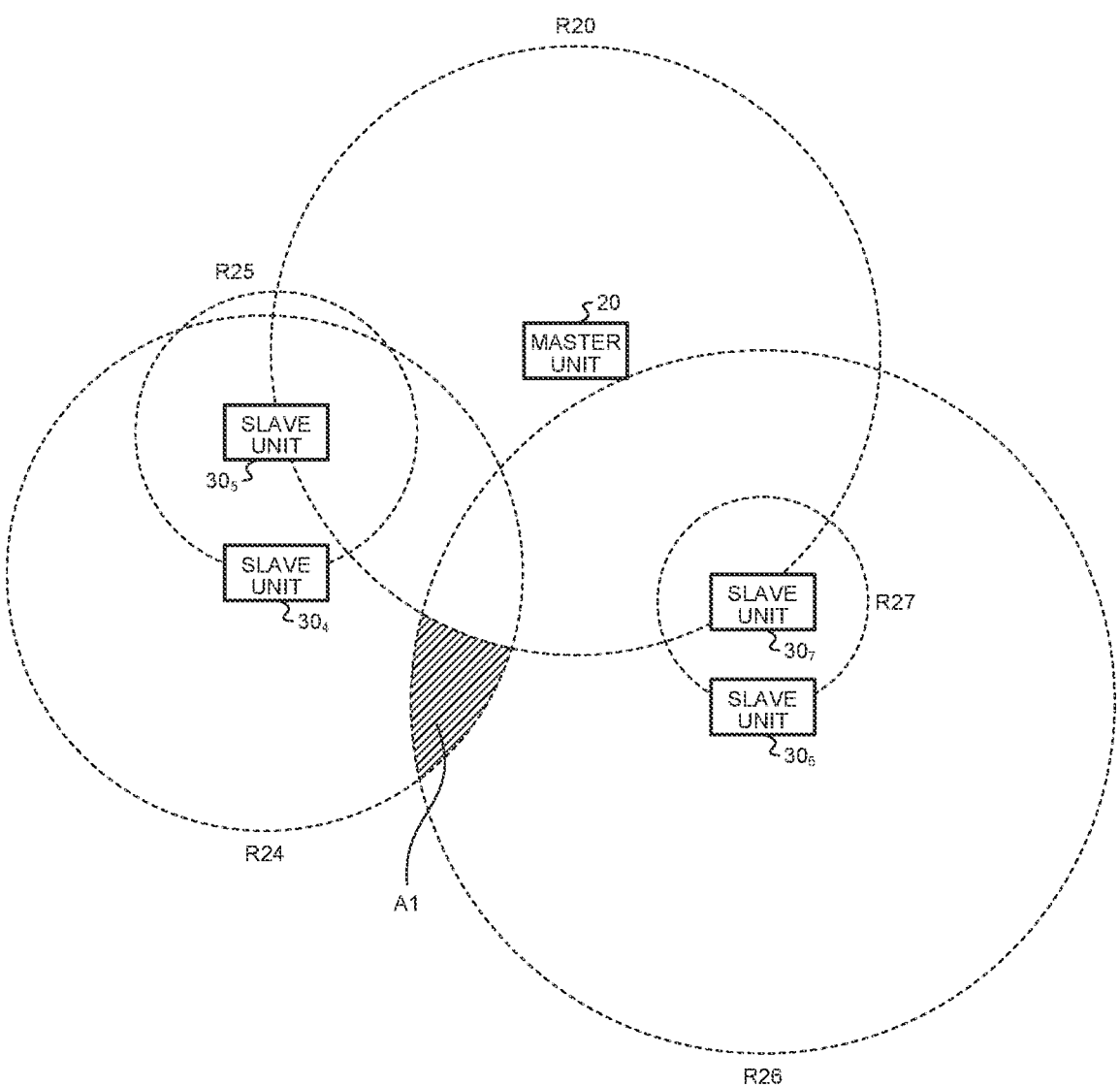
FIG. 5 is a diagram for explaining a method of identifying a position of a target device by the master unit.

A method of identifying a position of a target device by a master unit will be explained by using FIG. 5. FIG. 5 is a diagram for explaining a method of identifying a position of a target device by the master unit.

In FIG. 5, a method, which is performed by the master unit 20, of identifying a position of the slave unit $30_1$ based on pieces of origination information though the first route and the third route illustrated in FIG. 4.

With respect to the first route, upon receiving a wireless signal including the origination information from the slave unit $30_5$, the master unit 20 determines the signal intensity of the signal. The master unit 20 identifies a distance to a slave unit that has transmitted the wireless signal based on the signal intensity of the wireless signal acquired by a master unit or a slave unit present on the route, and identifies a position of the slave unit, assuming that the slave unit is present within a circle of a radius equal to the identified distance. When identifying the position of the slave unit $30_5$, for example, the master unit 20 determines that the slave unit $30_5$ is present in a range R20 based on the signal intensity of the wireless signal. Similarly, the master unit 20 determines that the slave unit $30_7$ is present in the range R20 on the third route. In FIG. 5, to simplify the explanation, it is explained assuming that the signal intensities from the slave unit $30_5$ and the slave unit $30_7$ are equivalent to each other for the master unit 20. When the signal intensities of the slave unit $30_5$ and the slave unit $30_7$ are different, the respective slave units are to be in circles of different radiuses around the master unit 20.

With respect to the first route, the master unit 20 identifies the position of the slave unit $30_4$ based on the origination information included in the wireless signal received from the slave unit $30_5$. The master unit 20 identifies the position of the slave unit $30_4$ based on the "SECOND SIGNAL INTENSITY". The master unit 20 determines that the slave unit $30_4$ is present in a range R25 based on a fact that the "SECOND SIGNAL INTENSITY" is "6/10". Similarly, with respect to the third route, the master unit 20 determines that the slave unit $30_6$ is present in a range R27 based on the fact that "SECOND SIGNAL INTENSITY" is "7/10".

With respect to the first route, the master unit 20 identifies the position of the slave unit $30_1$ based on the origination information included in the wireless signal received from the slave unit $30_5$. The master unit 20 estimates the position of the slave unit $30_1$ based on the "FIRST SIGNAL INTENSITY". The master unit 20 estimates that the slave unit $30_1$ is present in the range R24 based on the fact that the FIRST SIGNAL INTENSITY" is "3/10". Similarly, with respect to the third route, the master unit 20 estimates that the slave unit $30_1$ is present in a range R26 based on the fact that the "FIRST SIGNAL INTENSITY" is "1/10".

The master unit 20 may determine a common area to the range R24 estimated with respect to the first route and the range R26 estimated with respect to the third route, as an area in which the slave unit $30_1$ is positioned. Moreover, as illustrated in FIG. 5, an area A1 may be identified as the area in which the slave unit $30_1$ is positioned, by further excluding the range R20 from the area common to the range R24 and the range R26 from the area common to the range R24 and the range R26, taking into consideration that the signal intensities from the slave unit $30_5$ and the slave unit $30_7$ are equivalent to each other for the master unit 20. Moreover, as for the area to be excluded as a distance from the master unit 20, a circle having a radius identified based on the signal intensity of a signal transmitted from the slave unit $30_1$ may be determined as an area to be excluded. Thus, the master unit 20 can identify the position of the slave unit $30_1$ accurately based on two routes.

Although the method of identifying the position of the slave unit $30_1$ based on two routes has been explained in FIG. 5, the present disclosure is not limited thereto.

Figure 6:
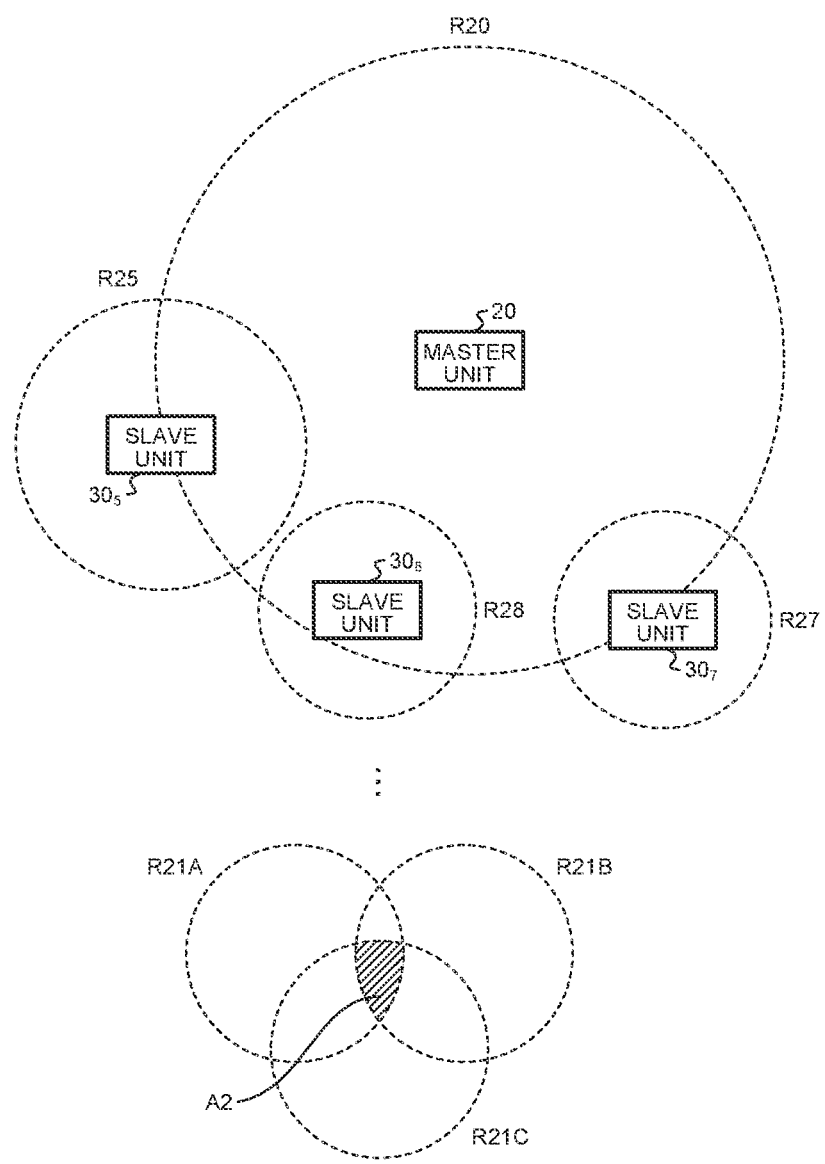
FIG. 6 is a diagram for explaining a method of identifying a position of a target device by the master unit.

For example, as illustrated in FIG. 6, the master unit 20 may identify the position of the slave unit $30_1$ based on three routes by receiving a signal from a slave unit $30_8$, in addition to the slave unit $30_5$ and the slave unit $30_7$. In this case, the master unit 20 determines an area A2 common to a range R21A, a range R21B, and a range R21C, as the area in which the slave unit $30_1$ is positioned. Because an area to be identified becomes narrower as the number of routes from the slave unit $30_1$ to the master unit 20 increases, the master unit 20 can identify the position of the slave unit $30_1$ more accurately.

Configuration of Master Unit

Figure 7:
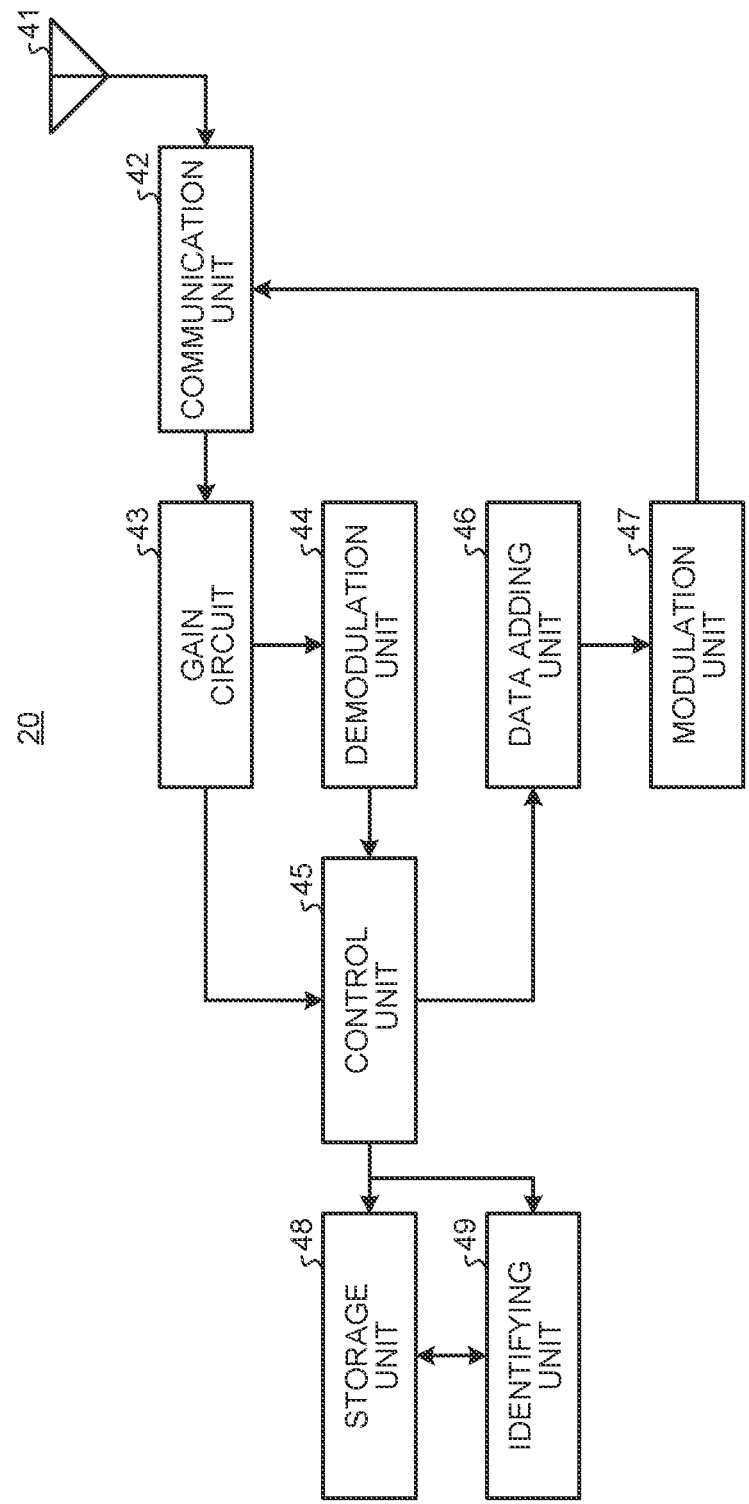
FIG. 7 is a block diagram illustrating an example of a configuration of the master unit according to the embodiment of the present disclosure.

A configuration of the master unit according to the embodiment of the present disclosure will be explained by using FIG. 7. FIG. 7 is a block diagram illustrating an example of a configuration of the master unit according to the embodiment of the present disclosure.

As illustrated in FIG. 7, the master unit 20 includes an antenna 41, a communication unit 42, a gain circuit 43, a demodulation unit 44, a control unit 45, a data adding unit 46, a modulation unit 47, a storage unit 48, and an identifying unit 49.

The communication unit 42 receives various kinds of wireless signals from the outside through the antenna 41. The communication unit 42 receives a wireless signal including origination information from the slave units through the antenna 41, for example. The communication unit 42 transmits various kinds of signals to the outside through the antenna 41. The communication unit 42 outputs the received wireless signal to the gain circuit 43.

The gain circuit 43 detects a signal intensity of a wireless signal received from the communication unit 42. The gain circuit 43 outputs information relating to the detected signal intensity to the control unit 45. The gain circuit 43 amplifies the signal received from the communication unit 42 at a predetermined amplification factor. The gain circuit 43 outputs the amplified signal to the demodulation unit 44.

The demodulation unit 44 demodulates the signal received from the gain circuit 43. Specifically, the demodulation unit 44 demodulates the signal received from the gain circuit 43 to convert it into a digital data string. The demodulation unit 44 outputs the demodulated signal to the control unit 45.

The control unit 45 is a controller that controls the entire master unit 20. The control unit 45 is implemented by, for example, a processor such as a central processing unit (CPU) or a micro processing unit (MPU). For example, the control unit 45 is implemented by the processor executing various kinds of programs stored in a storage device of the master unit 20 using a random access memory (RAM) or the like as a work area. The control unit 45 may be implemented by an integrated circuit such as an application specific integrated circuit (ASIC) and a field programmable gate array (FPGA).

The control unit 45 acquires, from the gain circuit 43, information relating to a signal intensity received from a slave unit. The control unit 45 outputs the acquired information relating to the signal intensity to the identifying unit 49. The control unit 45 acquires, from the demodulation unit 44, origination information of each of the slave units through which the signal has been relayed until it reaches the master unit 20 from the target device. The control unit 45 stores the acquired origination information in the storage unit 48.

The control unit 45 acquires, from the storage unit 48, various kinds of information to be transmitted to the outside. The control unit 45 outputs various kinds of information acquired from the storage unit 48 to the data adding unit 46.

The data adding unit 46 adds various kinds of data to a sound signal or an instruction signal to be transmitted to the outside by the master unit 20 and outputs it to the modulation unit 47. The data adding unit 46 does not necessarily add data to the sound signal or the instruction signal to be transmitted to the outside by the master unit 20.

The modulation unit 47 modulates the signal received from the data adding unit 46. Specifically, the modulation unit 47 digitally modulates the signal received from the data adding unit 46. The signal modulated by the modulation unit 47 is transmitted to the outside through the antenna 41 by the communication unit 42.

The storage unit 48 stores therein various kinds of information. The storage unit 48 stores therein origination information transmitted from a slave unit. Specifically, the storage unit 48 stores therein origination information for each route. The storage unit 48 can be implemented by a semiconductor memory device such as a RAM and a flash memory, or a storage device such as a hard disk and a solid state drive.

The identifying unit 49 identifies various kinds of information. The identifying unit 49 identifies various kinds of information based on origination information stored in the storage unit 48. The identifying unit 49 identifies, for example, at least two routes having different oldest route information among routes from the target device to the master unit 20 through plural slave units, based on the origination information. The identifying unit 49 identifies positions of respective slave units and a position of the target device, for example, based on signal intensities included in pieces of origination information relayed through at least two routes having different oldest route information.

The identifying unit 49 may identify at least two routes having all different relay communication devices present thereon, among routes from the target device to the master unit 20 through one or more slave units. In this case, the identifying unit 49 identifies the positions of the slave units and the position of the target device based on pieces of origination information relayed through at least two routes having all different relay communication devices present thereon from the target device to the master unit 20.

Configuration of Slave Unit

Figure 8:
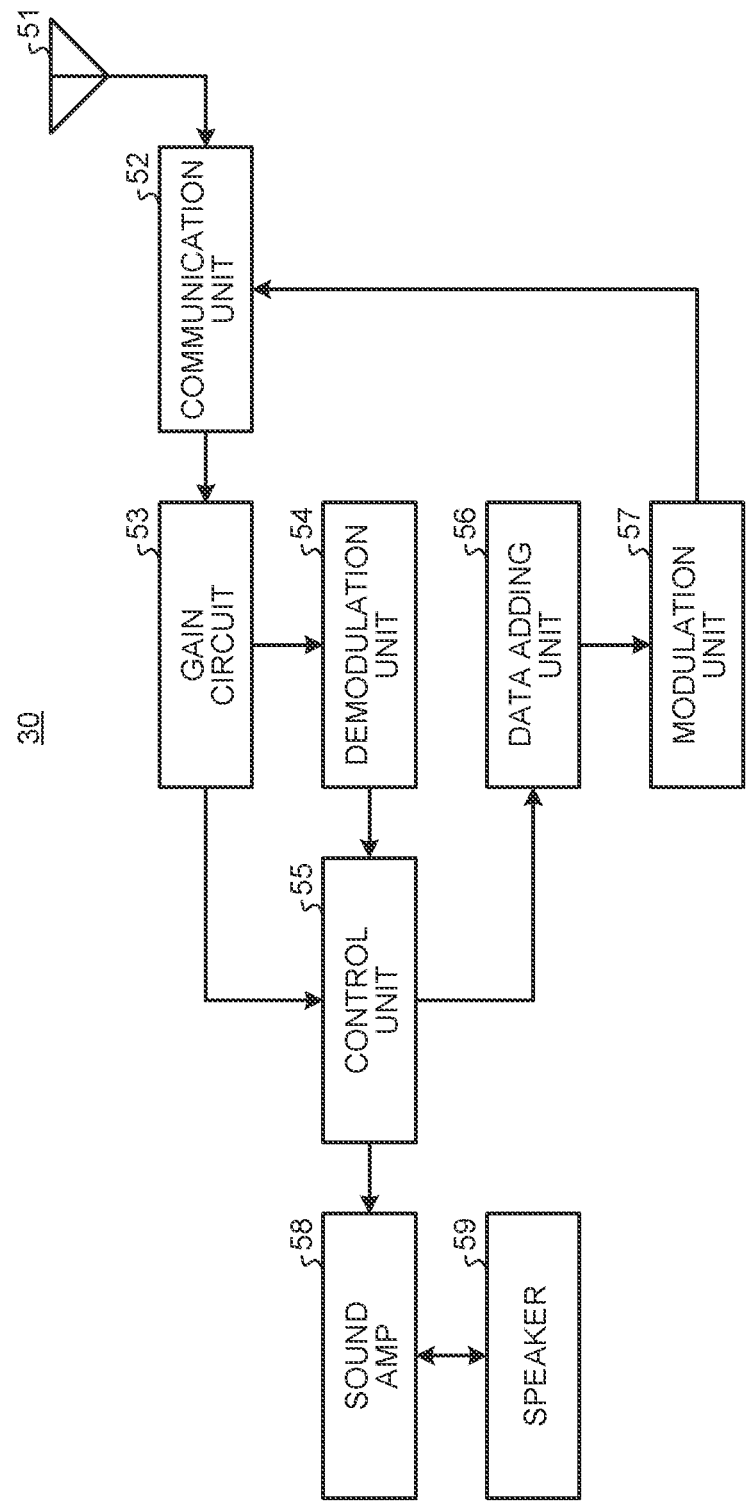
FIG. 8 is a block diagram illustrating an example of a configuration of a slave unit according to the embodiment of the present disclosure.

A configuration of a slave unit according to the embodiment of the present disclosure will be explained by using FIG. 8. FIG. 8 is a block diagram illustrating an example of a configuration of the slave unit according to the embodiment of the present disclosure.

As illustrated in FIG. 8, the slave unit 30 includes an antenna 51, a communication unit 52, a gain circuit 53, a demodulation unit 54, a control unit 55, a data adding unit 56, a modulation unit 57, a sound amplifier (AMP) 58, and a speaker 59.

Because the antenna 51, the communication unit 52, the gain circuit 53, and the demodulation unit 54 are same as the antenna 41, the communication unit 42, the gain circuit 43, and the demodulation unit 44 illustrated in FIG. 7, respectively, explanation thereof will be omitted.

The control unit 55 acquires, from the gain circuit 53, information relating to a signal intensity received from a slave unit. The control unit 55 outputs the information relating to the signal intensity to the data adding unit 56. The control unit 55 acquires, from the demodulation unit 44, origination information of each of the slave units through which the signal has been relayed until it reaches the master unit 20 from the target device. The control unit 55 outputs the acquired origination information to the data adding unit 56. The control unit 55 outputs, when a sound signal relating to a sound is acquired from the demodulation unit 44, the sound signal to the sound AMP 58.

The control unit 55 may determine that a user has lost the slave unit 30, for example, based on a measurement result of a sensor or the like not illustrated. Specifically, the control unit 55 may determine that the slave unit 30 is lost when no change in brightness has been observed for a predetermined period, or when it is determined that a state of ambient brightness or loudness of noise is different from a normal time. Moreover, the control unit 55 may output a sound from the speaker 59, or may emit light from a display unit or a light emitting diode (LED) not illustrated when it is determined that the slave unit 30 is lost.

The data adding unit 56 adds identification information of its own, time information, and information relating to a reception intensity received from the control unit 55 to the origination information received from the control unit 55, to update the origination information. The data adding unit 56 outputs the updated origination information to the modulation unit 57.

The modulation unit 57 modulates the updated origination information received from the data adding unit 56. The signal including the origination information modulated by the modulation unit 47 is transmitted to the outside by the communication unit 52 through the antenna 51.

When a sound signal is received from the control unit 55, the sound AMP 58 amplifies the sound signal. The speaker 59 outputs the sound signal amplified by the sound AMP 58 as a sound.

Processing Performed by Wireless Communication System

Figure 9:
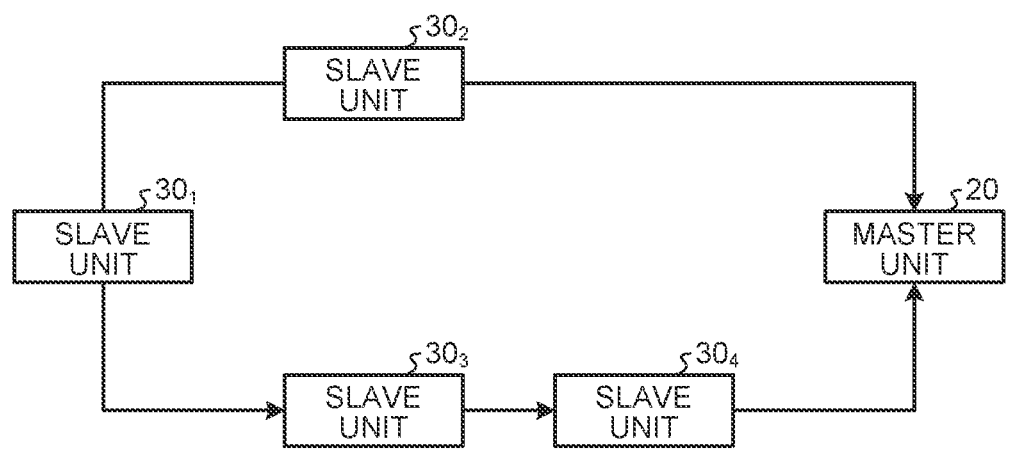
FIG. 9 is a diagram for explaining processing performed by the wireless communication system according to the embodiment of the present disclosure.
Figure 10:
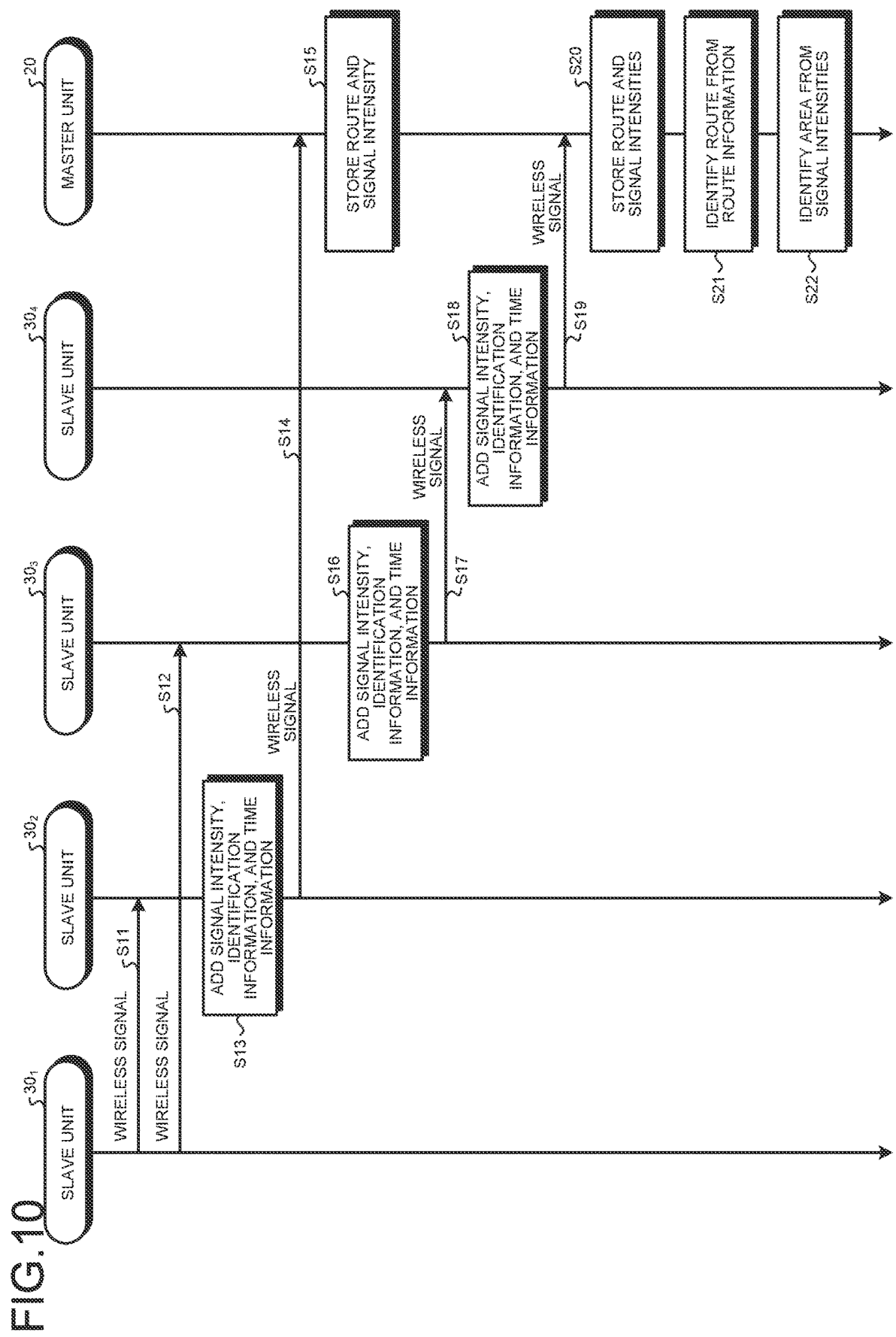
FIG. 10 is a sequence diagram illustrating a flow of the processing performed by the wireless communication system according to the embodiment of the present disclosure.

A flow of processing in the wireless communication system according to the embodiment of the present disclosure will be explained with reference to FIG. 9 and FIG. 10. FIG. 9 is a diagram for explaining the processing performed by the wireless communication system according to the embodiment of the present disclosure. FIG. 10 is a sequence diagram of a flow of the processing performed by the wireless communication system according to the embodiment of the present disclosure.

As illustrated in FIG. 9, a wireless communication system 10A includes the master unit 20, the slave unit $30_1$, the slave unit $30_2$, the slave unit $30_3$, and the slave unit $30_4$. In the wireless communication system 10A, the slave unit $30_1$ is the target device. In the following, a flow of processing of identifying a position of the slave unit $30_1$ based on a route from the slave unit $30_1$ to the master unit 20 through the slave unit $30_2$, and a route from the slave unit $30_1$ to the master unit 20 through the slave unit $30_3$ and the slave unit $30_4$ will be explained.

As illustrated in FIG. 10, first, the slave unit $30_1$ transmits a wireless signal including origination information, and the slave unit $30_2$ receives the signal (step S11). At the same time, the slave unit $30_3$ also receives the signal in parallel (step S12).

Upon receiving the wireless signal from the slave unit $30_1$, the slave unit $30_2$ adds a signal intensity of the wireless signal, time information, and identification information of its own to the origination information included in the wireless signal, to update the origination information (step S13). The slave unit $30_2$ transmits a wireless signal including the updated origination information to the master unit 20 (step S14).

The master unit 20 stores information relating to a route from the slave unit $30_1$ to the master unit 20 and the signal intensity based on the updated origination information (step S15).

Upon receiving the wireless signal from the slave unit $30_1$, the slave unit $30_3$ adds a signal intensity of the wireless signal, time information, and identification information of its own to the origination information included in the wireless signal, to update the origination information (step S16). The slave unit $30_3$ transmits the origination information thus updated to the slave unit $30_4$ (step S17).

Upon receiving the wireless signal from the slave unit $30_3$, the slave unit $30_4$ adds a signal intensity of the wireless signal, time information, and identification information of its own to the origination information included in the wireless signal, to further update the origination information (step S18). The slave unit $30_4$ transmits the origination information thus further updated to the master unit 20 (step S19).

The master unit 20 stores information relating to a route from the slave unit $30_1$ to the master unit 20 and the signal intensities based on the origination information thus further updated (step S20).

The master unit 20 identifies at least two routes having different oldest route information, among routes to the master unit 20 from the target device through at least one slave unit (step S21).

The master unit 20 identifies a position of the slave unit $30_1$, which is the target device, based on the signal intensities included in pieces of the origination information relating to the two routes (step S22), and ends the processing in FIG. 10.

Processing Performed by Target Device

Figure 11:
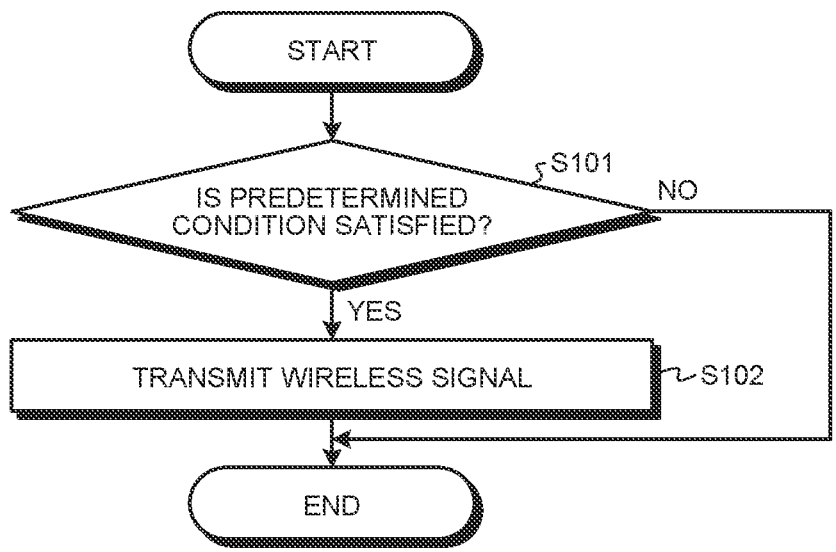
FIG. 11 is a flowchart illustrating an example of a flow of processing performed by a slave unit being a target device according to the embodiment of the present disclosure.

Processing performed by a slave unit, which is the target device, according to the embodiment of the present disclosure will be explained by using FIG. 11. FIG. 11 is a flowchart illustrating an example of a flow of the processing performed by the slave unit being the target device according to the embodiment of the present disclosure.

The slave unit 30 determines whether a predetermined condition is satisfied (step S101). The predetermined condition is a condition based on which the control unit 55 determines that the slave unit 30 has been lost. When it is determined that the predetermined condition is satisfied (step S101: YES), it proceeds to step S102. On the other hand, when it is determined that the predetermined condition is not satisfied (step S101: NO), the processing in FIG. 11 is ended.

When it is determined to be YES at step S101, the slave unit 30 transmits a wireless signal (step S102). Specifically, the slave unit 30 broadcasts a wireless signal including origination information by the communication unit 52, and ends the processing in FIG. 11.

Relay Processing Performed by Slave Unit

Figure 12:
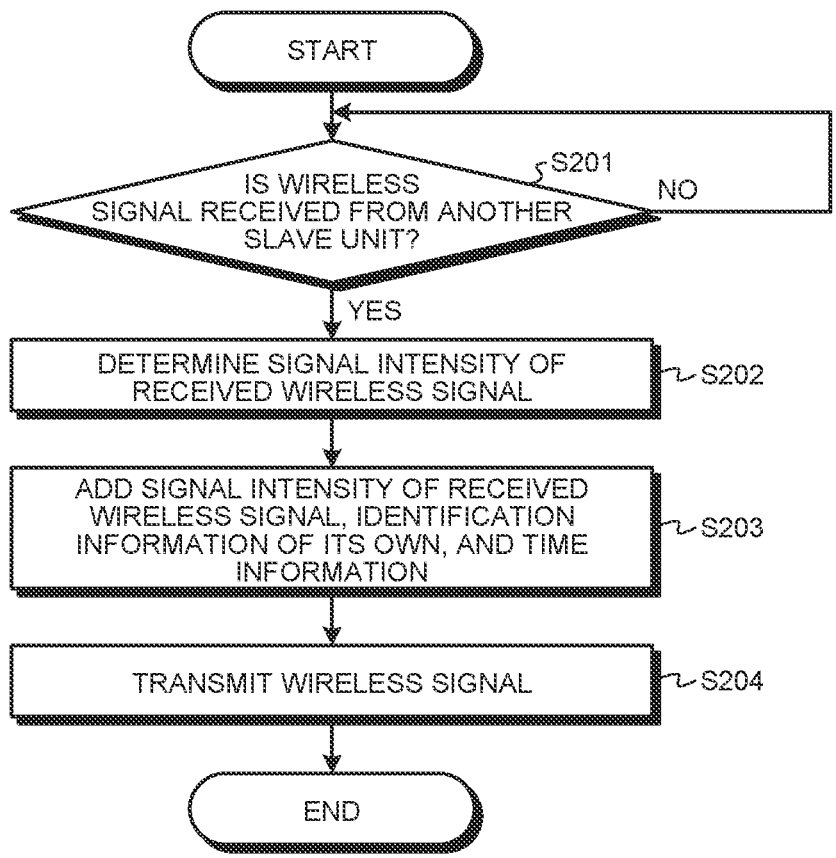
FIG. 12 is a flowchart illustrating an example of relay processing of the slave unit according to the embodiment of the present disclosure.

A flow of relay processing performed by the slave unit according to the embodiment of the present disclosure will be explained by using FIG. 12. FIG. 12 is a flowchart illustrating an example of the relay processing performed by the slave unit according to the embodiment of the present disclosure.

The slave unit 30 determines whether a wireless signal is received from another slave unit (step S201). Specifically, it is determined whether a wireless signal including origination information is received from another slave unit by the communication unit 52. When it is determined that the wireless signal is received (step S201: YES), it proceeds to step S202. When it is determined that the wireless signal is not received (step S201: NO), the process at step S201 is repeated.

When it is determined to be YES at step S201, the slave unit 30 determines a signal intensity of the received wireless signal (step S202). Specifically, the gain circuit 53 determines the signal intensity of the received wireless signal, and it proceeds to step S203.

The slave unit 30 adds the signal intensity of the received wireless signal, identification of its own, and time information to the origination information included in the received wireless signal, to update the origination information (step S203). Specifically, the data adding unit 56 adds the signal intensity of the received wireless signal, the identification of its own, and the time information to the origination information included in the received wireless signal, to update the origination information, and it proceeds to step S204.

The slave unit 30 transmits a wireless signal including origination information thus updated (step S204). Specifically, the communication unit 52 broadcasts the wireless signal including origination information updated at step S203, and the processing in FIG. 12 is ended.

Processing performed by Master unit

A flow of processing of identifying a position of a target device performed by the master unit according to the embodiment of the present disclosure will be explained by using FIG. 13. FIG. 13 is a flowchart illustrating an example of a flow of the processing of identifying a position of a target device, performed by the master unit according to the embodiment of the present disclosure.

The master unit 20 receives a wireless signal from each slave unit (step S301). Specifically, the communication unit 42 receives a wireless signal including origination information from each slave unit, and it proceeds to step S302.

The master unit 20 determines a signal intensity of the received wireless signal (step S302). Specifically, the gain circuit 43 determines the signal intensity of the wireless signal received at step S301, and it proceeds to step S303.

The master unit 20 stores origination information included in the wireless signal (step S303). Specifically, the control unit 45 stores the origination information included in the wireless signal received at step S301, and it proceeds to step S304.

The master unit 20 determines whether there are at least two route having different oldest route information, among routes from the target device to the master unit (step S304). Specifically, the identifying unit 49 determines whether there are at least two routes having different oldest route information based on pieces of the origination information stored in the storage unit 48. When it is determined that there are at least two routes having different oldest route information (step S304: YES), it proceeds to step S305. On the other hand, when it is determined that there is not at least two routes having different oldest route information (step S304: NO), it proceeds to step S301.

When it is determined to be YES at step S304, the master unit 20 determines routes (step S305). Specifically, the identifying unit 49 determines two or more routes having different oldest route information, to identify a position of the target device, and it proceeds to step S306).

The master unit 20 estimates a position of the target device (step S306). Specifically, the identifying unit 49 estimates the position of the target device based on the routes determined at step S305, and it proceeds to step S307.

The master unit 20 identifies the position of the target device based on the signal intensities (step S307). Specifically, the identifying unit 49 identifies the position of the target device based on the signal intensity of each slave unit relating to the route determined at step S305, and the processing in FIG. 13 is ended.

As described above, the present embodiment enables to identify a position of a specific target device by using only near field communication. In the present embodiment, multiple receivers receive a wireless signal from the target device, so that the accuracy of identifying a position of the target device can be improved.

Moreover, in the present embodiment, because a position of the target device can by identified only by near field communication, cost can be suppressed.

According to the present disclosure, a position of an object can be identified easily.

The embodiment of the present disclosure has been explained above, but the present disclosure is not limited by these embodiments. Moreover, the components described above include what can be easily thought of by those skilled in the art, what is substantially the same, and those within a range of equivalence. Furthermore, the components described above can be combined as appropriate. Moreover, respective components can be omitted, replace, or changed within a range not departing from a gist of the embodiment described above.

What is claimed is:

1. A wireless communication system comprising:
   a plurality of relay communication devices including a target device; and
   a communication device, wherein
   each of the relay communication devices includes
   a first control unit configured to acquire, based on a wireless signal including origination information received from each of the target device and another relay communication device, signal intensity information relating to a signal intensity of the wireless signal;
   a data adding unit configured to add the signal intensity information, time information, and identification information of its own to the origination information, to update the origination information; and
   a communication unit configured to broadcast the updated origination information, wherein
   the communication device includes
   a second control unit configured to acquire the updated origination information;
   an identifying unit configured to identify, based on communication-path information included in the updated origination information included in a wireless signal received from each of the relay communication devices, at least two communication paths among communication paths from the target device to the communication device through at least one of the relay communication devices, the communication-path information indicating through which of the at least one of the relay communication devices the origination information of the target device is relayed, and wherein
   the identifying unit identifies, by referring to the communication-path information, the at least two communication paths in which the relay communication devices that have first received the origination information of the target device are different.

2. The wireless communication system according to claim 1, wherein the identifying unit is configured to identify a position of the target device based on the identified at least two communication paths.

3. The wireless communication system according to claim 1, wherein the second control unit is configured to acquire a signal intensity of a wireless signal received by the relay communication device present on the communication path identified by the identifying unit.

4. The wireless communication system according to claim 3, wherein the identifying unit is configured to identify the position of the target device based on the signal intensity that is acquired by the second control unit and is received by the relay communication device present on the communication path identified by the identifying unit.

5. The wireless communication system according to claim 1, wherein the identifying unit is configured to identify the at least two communication paths having all different relay communication devices present thereon, among the communication paths from the target device to the communication device through the at least one of the relay communication devices.

6. The wireless communication system according to claim 5, wherein the identifying unit is configured to identify the position of the target device based on the at least two communication paths having all different relay communication devices present thereon.

7. The wireless communication system according to claim 1, wherein, when a predetermined condition is satisfied, the target device broadcasts the origination information that includes identification information to identify the target device and time information.

8. A communication method performed in a wireless communication system that includes a plurality of relay communication devices including a target device, and a communication device, the method comprising:
- acquiring, by each of the relay communication devices, based on a wireless signal including origination information received from each of the target device and another relay communication device, signal intensity information relating to a signal intensity of the wireless signal;
- adding, by the each of the relay communication devices, the signal intensity information, time information, and identification information of its own to the origination information, to update the origination information;
- broadcasting, by each of the relay communication devices, the updated origination information;
- acquiring, by the communication device, the updated origination information; and
- referring to, by the communication device, communication-path information included in the updated origination information included in a wireless signal received from each of the relay communication devices, the communication-path information indicating through which of at least one of the relay communication devices the origination information of the target device is relayed, so as to identify at least two communication paths in which the relay communication devices that have first received the origination information of the target device are different.

9. The communication method according to claim 8, further comprising:
- identifying a position of the target device based on the identified at least two communication paths.

\* \* \* \* \*